US009438541B2

(12) United States Patent
Sorokin

(10) Patent No.: US 9,438,541 B2
(45) Date of Patent: Sep. 6, 2016

(54) METHOD, A SYSTEM, A FIRST SERVER, A SECOND SERVER, A COMPUTER PROGRAM AND A COMPUTER PROGRAM PRODUCT FOR SENDING INFORMATION ABOUT USERS ASSIGNED TO WORK ON TASKS IN A COMPUTER NETWORK

(75) Inventor: Roman Sorokin, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 230 days.

(21) Appl. No.: 14/115,905

(22) PCT Filed: Mar. 28, 2012

(86) PCT No.: PCT/EP2012/055446
§ 371 (c)(1),
(2), (4) Date: Nov. 6, 2013

(87) PCT Pub. No.: WO2012/152499
PCT Pub. Date: Nov. 15, 2012

(65) Prior Publication Data
US 2014/0095642 A1    Apr. 3, 2014

(30) Foreign Application Priority Data
May 6, 2011  (EP) .................................... 11305533

(51) Int. Cl.
*H04L 12/58* (2006.01)
*G06F 9/50* (2006.01)
*G06Q 10/06* (2012.01)

(52) U.S. Cl.
CPC ............. *H04L 51/00* (2013.01); *G06F 9/5027* (2013.01); *G06Q 10/06* (2013.01)

(58) Field of Classification Search
CPC ................................. H04L 9/32; G06F 17/60

USPC .......................................................... 709/206
See application file for complete search history.

(56) References Cited

U.S. PATENT DOCUMENTS

| 7,562,362 B1 * | 7/2009 | Paquette ............... G06F 9/4881 714/100 |
| 2009/0204471 A1 * | 8/2009 | Elenbaas .......... G06Q 10/06311 705/7.13 |

FOREIGN PATENT DOCUMENTS

WO    WO 2010/076774 A1    7/2010

OTHER PUBLICATIONS

David Hollingsworth, "Workflow Management Coalition, The Workflow Reference Model," Document No. TC00-1003, Document Status—Issue 1.1, XP002218704, pp. 1-55, Jan. 19, 1995.

(Continued)

*Primary Examiner* — David Lazaro
*Assistant Examiner* — Zia Khurshid
(74) *Attorney, Agent, or Firm* — Fay Sharpe, LLP

(57) ABSTRACT

The invention concerns a method for sending information about users assigned to work on tasks, wherein data sets comprising information about users and tasks the users are assigned to are stored in particular on a first server (101), wherein a request for information about a user is received, in particular via a receiver (API) of said first server (101), wherein said request comprises information about a predetermined task, wherein a test is performed, in particular by a processor (111) of said first server (101) to determine a data set comprising information about a user assigned to said predetermined task, wherein a reply is sent, in particular by a sender (API) of said first server (101), depending on the result of said test, wherein said reply comprises information about said user.

20 Claims, 3 Drawing Sheets

(56) References Cited

OTHER PUBLICATIONS

International Search Report for PCT/EP2012/055446 dated Apr. 25, 2012.

PCT Patent Application No. PCT/EP2012/055446, Written Opinion of the International Searching Authority, Mailed Apr. 25, 2012, 5 pp.
European Patent Application No. 11305533.9, Extended European Search Report, Mailed Oct. 7, 2011, 7 pp.

* cited by examiner

METHOD, A SYSTEM, A FIRST SERVER, A SECOND SERVER, A COMPUTER PROGRAM AND A COMPUTER PROGRAM PRODUCT FOR SENDING INFORMATION ABOUT USERS ASSIGNED TO WORK ON TASKS IN A COMPUTER NETWORK

FIELD OF THE INVENTION

The invention relates to a method, a system, a first server, a second server, a computer program and a computer program product for sending information about users assigned to work on tasks in a computer network.

BACKGROUND

Assigning tasks to users in a computer network is known for example from resource management computer programs. In such resource management computer programs, typically projects are divided into tasks. Each task is assigned to one or more users. Datasets, for example in databases, are used to make such assignments. Said datasets for example comprise username and task name.

Typically, the user of such resource management tool, the users working on tasks and—optionally—managers supporting the users, may access information about users and tasks via said resource management tool. However, resource management systems are typically limited to provide static information about users working on tasks.

SUMMARY

The object of the invention is thus to provide dynamic information about users working on tasks in said resource management system.

The main idea of the invention is thus to send information about users assigned to work on tasks, wherein datasets comprising information about users and tasks the users are assigned to are stored, in particular on a first server, wherein a request for information about a user is received, in particular via a receiver of said first server, wherein said request comprises information about a predetermined task, wherein a test is performed in particular by a processor of said first server to determine a dataset comprising information about a user assigned to said predetermined task, wherein a reply is sent in particular by a sender of said first server, depending on the result of said test, wherein said reply comprises information about said user. This way, dynamic information about said users is provided to said resource management system via said computer network.

Advantageously, said reply is sent only if a dataset of a user assigned to said predetermined task is found. This avoids unnecessary network traffic.

Advantageously, a request to assign a dataset comprising information about a predetermined user with a predetermined task is received in particular via said receiver of said first server. This way, a storage, storing said datasets, is updated with the latest information about users and their assignments to tasks in said resource management system. This improves further the quality of the information sent.

Advantageously, upon receipt of said request, said dataset of said predetermined user is assigned with said predetermined task. This way, a new task assignment is recorded in said dataset to improve reliability of the information sent.

Advantageously, said request to assign said dataset is determined by a second server, in particular during creation of a new task in a resource management computer program executing on said second server, depending on input received upon prompting to select a user to be assigned to work on a predetermined task. This way, any change to task assignments on said second server using said resource management computer program are provided to said first server for up-to-date information about users to be sent back to said second server.

Advantageously, said reply is received and displayed by a second server. This way, said resource management system integrates said user information sent by said first server.

Advantageously, said information about said user comprises information about a geographical position of a device assigned to said user. This way, dynamically additional information like the geographic position of a user is added to the information sent.

Advantageously, said information about said user comprises information about an address of a device assigned to said user. This way, said user may be reachable via said device using the address of said device.

Advantageously, a communication connection request is sent do said address of said device assigned to said user. This way, an easy way for connecting user assigned to the same task of said resource management computer program is provided.

Further developments of the invention can be gathered from dependent claims and the following description.

BRIEF DESCRIPTION OF THE FIGURES

In the following the invention will be explained further, making reference to the attached drawings.

DESCRIPTION OF THE EMBODIMENTS

Figure 1:
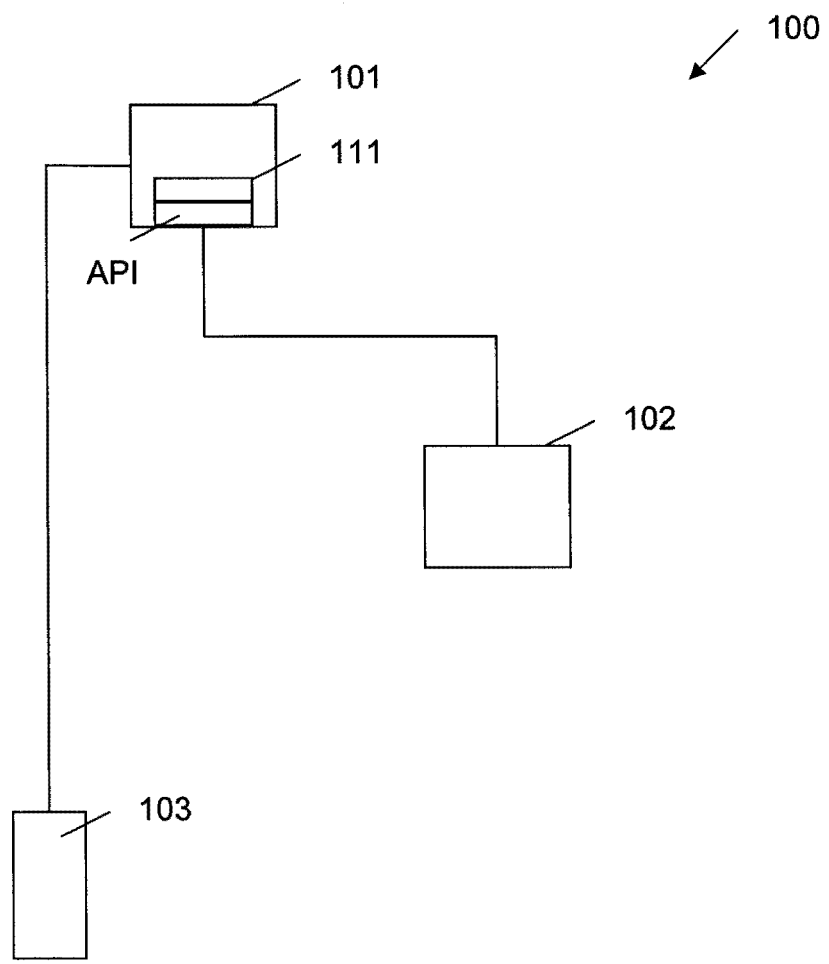
FIG. 1 schematically shows part of a computer network.

FIG. 1 shows a part of a computer network 100.
Said computer network 100 comprises a first server 101, a second server 102 and a device 103.

Said first server 101, said second server 102 and said device 103 are connected for example via local area network (LAN), wireless local area network (WLAN, 802.11N) or wide area network (WAN).

Said connection is for example according to the well known internet protocol (IP), user datagram protocol (UDP), transmission control protocol (TCP) or a stream control transmission protocol (SCTP).

Signaling is for example according to the well known simple object access protocol (SOAP), representational state transfer (REST) or session initiation protocol (SIP) or internet protocol multimedia subsystem (IMS).

Addressing may be done using the well known uniform resource locators (URL), uniform resource identifiers (URI), names or namespaces of extensible markup language (XML version 1.0, 3rd edition, W3C recommendation 8, December 2009).

The connection can but must not be directly between the servers and the device. The typical use is on wide area networks with multiple intermediate devices, where only said servers and said device are depicted in FIG. 1.

Said first server 101 is adapted to store datasets comprising information about users. Furthermore, said datasets comprise information about tasks the users are assigned to.

Said datasets for example comprise a user identifier, for example a user name, a task marker, for example a string "task1". Said dataset optionally comprises an address of a device assigned to said user, for example an IP-address. Furthermore said dataset for example comprises a user information, for example a GPS position from a device assigned to said user.

Furthermore, said first server 101 comprises a sender and receiver API, for example an application programmable interface. Said sender and receiver API is adapted to send and receive messages according to any of the aforementioned protocols.

Said first server 101 comprises a processor 111, adapted to determine datasets comprising information about users assigned to predetermined tasks.

Said first server 101 is for example adapted to upon receipt of a request for user information by said receiver determine said user information from said datasets via said processor 111 and to send a reply comprising said information bout said user using said sender API.

Optionally, said first server 101 is adapted to receive frequent updates from devices of users having datasets stored on said first server 101. For example said first server 101 is adapted to receive pushed or polled updates. For example said updates are regarding a GPS position of users having devices connected to said first server 101 via said computer network 100. For example said updates are pushed or polled every minute.

Said first server 101 is for example a server of an enterprise telecom system running a computer program providing said API and having a data base of telecommunication users.

Said second server 102 is adapted to run a resource management computer program. Said resource management computer program is for example a computer program adapted to assign individual tasks of a project to individual users. To that end, said second server 102 may comprise a database storing information about tasks and users and the assignment of tasks and users.

Additionally, said second server 102 is adapted to send and receive messages to and from said first server, for example using said application programmable interface of said first server.

Furthermore, said second server 102 is adapted to display replies received from said first server, for example said information about said user. For example said second server 102 is adapted to display said additional information like said GPS position next to said user's name in said resource management computer program.

Furthermore, said second server 102 may be adapted to establish a connection with a device assigned to a user. To that end, said second server 102 is for example adapted to receive said IP-number from said first server 101 as said information about said user and to send a request for a connection to said device 103 of said user using said IP-address.

Said second server 102 is for example a server of a company who's worker use communication devices via said first server 101, e.g. said enterprise telecom system.

Methods for resource management and computer programs for that are well known to the person skilled in the art and not explained further. Said device 103 is adapted to connect to said first server 101 via said computer network 100. For example, said device 103 is a mobile phone with a GPS sensor having an address, for example an internet protocol address. Furthermore, said device 103 is adapted to send GPS data to said first server 101 optionally. Said device 103 may send said GPS data to said first server via pushing or polling mode.

Furthermore, said device 103 is adapted to receive connection requests, for example using IP-addresses. Said device 103 is for example assigned by said company to said worker and registered with said enterprise telecom system.

Below methods for integrating resource management system and enterprise telecom system are explained. Goal is to create a way for participants of a task in said resource management system to access information about users of said device 103 that is typically only available to the telecom system.

Figure 2:
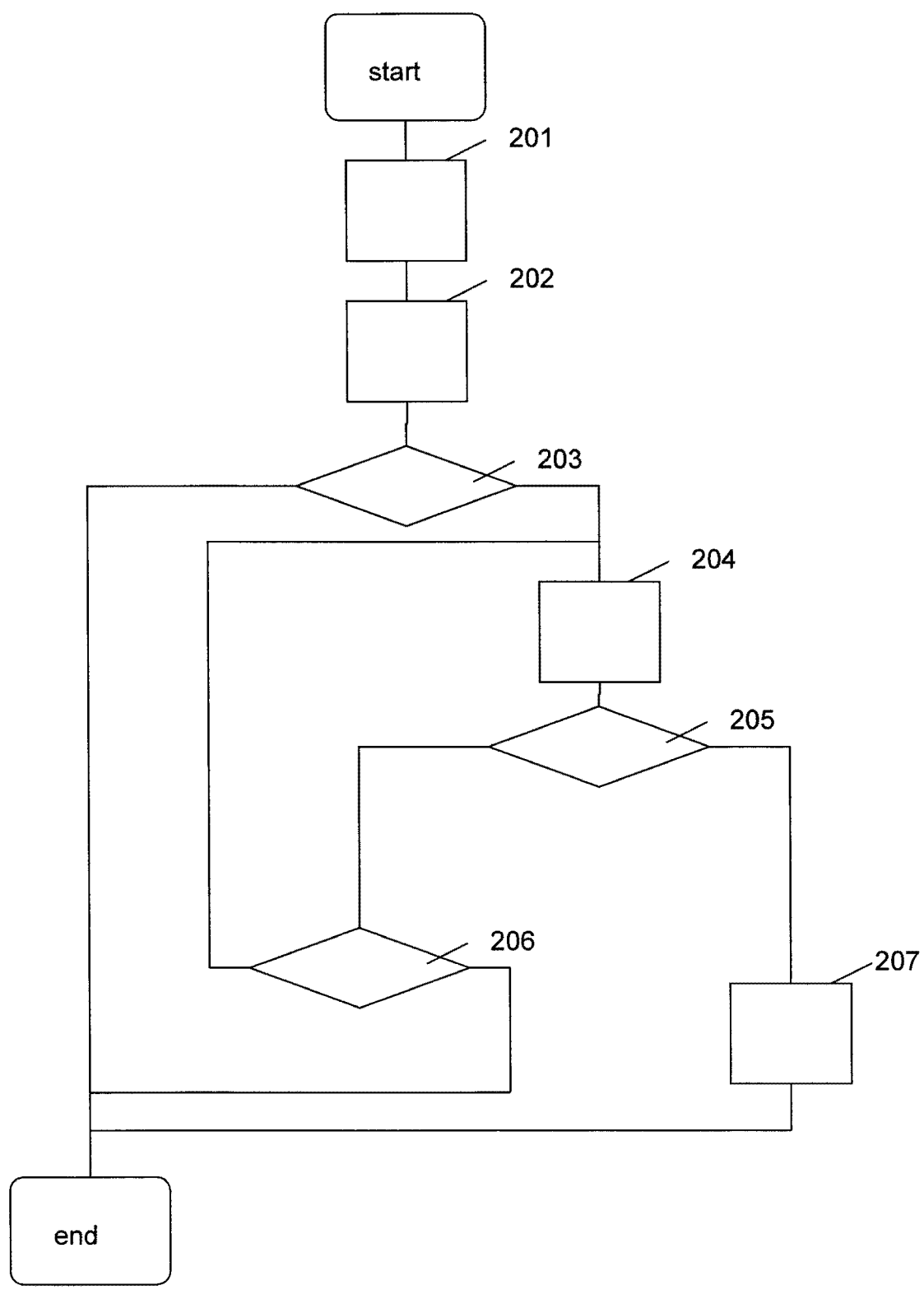
FIG. 2 schematically shows a first flowchart.

A first method for sending user information is described below, making reference to FIG. 2. Goal of said first method is to create a link between a user of said resource management and said enterprise communication system, preferably in real time.

Said message starts for example when a user of said resource management program adds a user to a task during creation of a new task or when modifying an existing task.

After the start, a step 201 is executed.

In said step 201, a prompt for user input, for example a window with a list of available users in order to select a user to be assigned to work on a predetermined task is displayed. Said task for example is identified by a task marker "task1". Said users are for example identified by said user identifier, for example said user name.

Afterwards a optional step 202 is executed.

In said step 202 optionally a prompt for user input, for example a checkbox is displayed next to said user to be assigned to work on said predetermined task. Said prompt for example requests confirmation to add said user to a communication group for said predetermined task.

Afterwards, a optional step 203 is executed.

Said step 203 is optional. In said Step 203 a test is performed to determine if said user input, prompting confirmation for the addition of said user to said communication group is yes or no. For example said test determined via said checkbox is checked or not. In case said user shall be added to said communication group a step 204 is executed. Otherwise the method ends. Ending in this context means that the regular resource management computer program continues with storing the information about said user and task assigned to without further information.

In said step 204 a request to assign the dataset of the predetermined user with the predetermined task is sent to said first server 101. Said request for example comprises said task marker "task1" and said user identifier, for example said username. Afterwards, a step 205 is executed.

In said step 205 a test is performed to determine whether a request to assign a dataset of a predetermined user with a predetermined task has been received, for example via said receiver API. In case a request has been received a step 207 is executed, otherwise a step 206 is executed.

In said step 207 said dataset of said predetermined user is assigned to said predetermined user. For example said task marker "task1" is stored in said dataset together with said user identifier, for example said username. Afterwards, the method ends.

In said step 206 a timeout condition is monitored. In case said timeout condition is met, said method ends. Otherwise said step 205 is executed.

Figure 3:
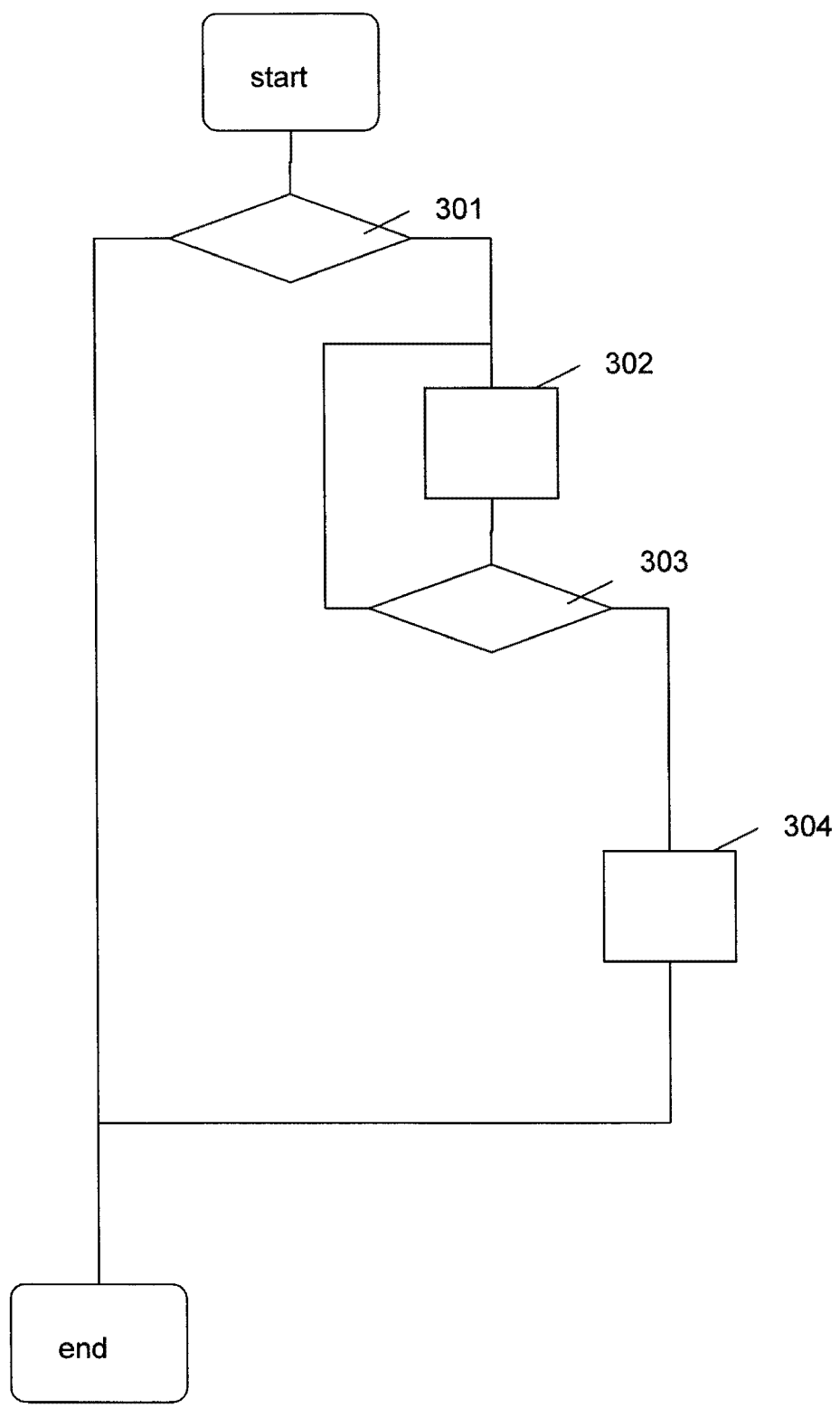
FIG. 3 schematically shows a second flowchart.

A second method for sending said user information is described making reference to FIG. 3. Goal of said second method is to use said link between a user of said resource management and said enterprise communication system, to make updated information about said user from said telecom system available in said resource management system, preferably in real time. This way ad hoc conferences with available workers of tasks can easily be scheduled, workers tagged by said task marker may be found and communication may be routed by said enterprise telecom system automatically, or position of users working on the task tagged with said task marker may be displayed in said resource management system.

Said method starts for example upon receipt of a request about information about a user assigned to a predetermined task. Said request for example contains said task marker "task1".

After the start, a step 301 is executed.

In said step 301 a test is performed to determine if datasets containing said task marker for example "task1" is available in said storage. In case a dataset containing said task marker is found, a step 302 is executed. Otherwise said method ends.

In said step 302 said user information is determined, for example said username is determined from said dataset.

Afterwards an optional step 303 is executed.

In said optional step 303 a test is performed to determine if said user information has been determined for all datasets containing said task marker. In case all user information from all datasets containing said task marker, e.g. "task1" have been determined, a step 304 is executed, otherwise said step 302 is executed.

In said step 304 said user information, for example said username is sent. Afterwards, said method ends.

Optionally, in said step 304 all usernames found in step 302 and 303 are sent.

Optionally, said GPS-data of one or all users are determined from said datasets and set in said steps 302, 303 and 304.

The methods described above may be implemented as computer programs and stored on computer program products.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method of maintaining user information for resource management, comprising:
   storing a plurality of data sets at a first server for a plurality of tasks that were assigned to one or more users by an operator using a second server, each data set comprising task information about at least one task and user information about each user assigned to perform the corresponding task(s), the user information including a user identifier, the task information including a task marker, each user identifier in the stored data sets associated with a user device assigned to the corresponding user;
   updating the user information stored in the data sets based at least in part on fresh user information received by the first server from user devices associated with the one or more users assigned to perform the plurality of tasks;
   receiving an information request for user information associated with a predetermined task at the first server from the second server;
   performing a test at said first server to determine if the predetermined task is associated with any data set stored at the first server; and
   sending a reply from said first server to the second server in response to the information request depending on results of said test.

2. The method according to claim 1, wherein said reply is sent only if said predetermined task is found in at least one data set stored at the first server and at least one user is assigned to perform said predetermined task.

3. The method according to claim 1, further comprising:
   receiving an assignment request to assign a new data set comprising user information about a predetermined user and task information about a predetermined task at said first server from the second server.

4. The method according to claim 3, further comprising:
in response to said assignment request, assigning said new data set to associate said predetermined user with said predetermined task; and
storing the new data set at the first server along with the plurality of data sets.

5. The method according to claim 3, wherein said assignment request is determined by the second server in conjunction with creation of the predetermined task in a resource management computer program executing on said second server based at least in part on input parameters received upon prompting an operator to select the predetermined task and to assign the predetermined user to perform the predetermined task.

6. The method according to claim 1 wherein said reply to the information request is received and displayed by the second server.

7. The method according to claim 1, wherein said user information comprises a geographical position of the user device assigned to said corresponding user.

8. The method according to claim 1, wherein said user information comprises a device address of the user device assigned to said corresponding user.

9. The method according to claim 8, further comprising:
sending a communication connection request from the first server to at least one user device using said device address of said corresponding user device.

10. The method according to claim 1, wherein the fresh user information received from one or more user devices includes a geographical position of the corresponding user device.

11. The method according to claim 1, wherein the fresh user information is received from one or more user devices via a dynamic update mode.

12. The method according to claim 1, wherein the fresh user information is received from one or more user devices via a pushing mode.

13. The method according to claim 1, wherein the fresh user information is received from one or more user devices via a polling mode.

14. The method according to claim 1, wherein the reply provides the second server with dynamically updated user information.

15. The method according to claim 1, wherein the reply provides the second server with user information in real time.

16. A resource information server for maintaining user information associated with resource management, the resource information server comprising:
at least one processor and associated memory;
a receiver;
a sender; and
a storage device configured to store a plurality of data sets for a plurality of tasks that were assigned to one or more users by an operator using a resource management server, each data set comprising task information about at least one task and user information about each user assigned to perform the corresponding task(s), the user information including a user identifier, the task information including a task marker, each user identifier in the stored data sets associated with a user device assigned to the corresponding user;
wherein the at least one processor is configured to update the user information stored in the data sets based at least in part on fresh user information received by the receiver from user devices associated with the one or more users assigned to perform the plurality of tasks;
wherein the receiver is configured to receive an information request for user information associated with a predetermined task from the resource management server;
wherein the at least one processor is configured to perform a test to determine if the predetermined task is associated with any data set stored at the storage device;
wherein the sender is configured to send a reply to the resource management server in response to the information request depending on results of said test.

17. A resource management server for managing resources, comprising:
at least one processor and associated memory;
a sender configured to send an information request for user information associated with a predetermined task to a resource information server, wherein the resource information server is configured to store a plurality of data sets for a plurality of tasks that were assigned to one or more users by an operator using the resource management server in conjunction with the at least one processor, each data set comprising task information about at least one task and user information about each user assigned to perform the corresponding task(s), the user information including a user identifier, the task information including a task marker, each user identifier in the stored data sets associated with a user device assigned to the corresponding user, wherein the resource information server is configured to update the user information stored in the data sets based at least in part on fresh user information received by the resource information server from user devices associated with the one or more users assigned to perform the plurality of tasks, wherein the resource information server is configured to perform a test to determine if the predetermined task is associated with any data set stored at the resource information server; and
a receiver configured to receive a reply from the resource information server in response to the information request depending on the results of the test.

18. A non-transitory computer readable medium storing program instructions that, when executed by a first server, cause the first server to perform a method of maintaining user information for resource management, the method comprising:
storing a plurality of data sets at the first server for a plurality of tasks that were assigned to one or more users by an operator using a second server, each data set comprising task information about at least one task and user information about each user assigned to perform the corresponding task(s), the user information including a user identifier, the task information including a task marker, each user identifier in the stored data sets associated with a user device assigned to the corresponding user;
updating the user information stored in the data sets based at least in part on fresh user information received by the first server from user devices associated with the one or more users assigned to perform the plurality of tasks;
receiving an information request for user information associated with a predetermined task at the first server from the second server;
performing a test at the first server to determine if the predetermined task is associated with any data set stored at the first server; and sending a reply from the first server to the second server in response to the information request depending on results of said test.

19. A method of managing resources, comprising:
sending an information request for user information associated with a predetermined task from a second server to a first server, wherein the first server is configured to store a plurality of data sets for a plurality of tasks that were assigned to one or more users by an operator using the second server, each data set comprising task information about at least one task and user information about each user assigned to perform the corresponding task(s), the user information including a user identifier, the task information including a task marker, each user identifier in the stored data sets associated with a user device assigned to the corresponding user, wherein the first server is configured to update the user information stored in the data sets based at least in part on fresh user information received by the first server from user devices associated with the one or more users assigned to perform the plurality of tasks, wherein the first server is configured to perform a test to determine if the predetermined task is associated with any data set stored at the first server; and
receiving a reply from the first server at the second server in response to the information request depending on results of the test.

20. A non-transitory computer-readable medium storing program instructions that, when executed by a second server, cause the second server to perform a method of managing resources, the method comprising:
sending an information request for user information associated with a predetermined task from the second server to a first server, wherein the first server is configured to store a plurality of data sets for a plurality of tasks that were assigned to one or more users by an operator using the second server, each data set comprising task information about at least one task and user information about each user assigned to perform the corresponding task(s), the user information including a user identifier, the task information including a task marker, each user identifier in the stored data sets associated with a user device assigned to the corresponding user, wherein the first server is configured to update the user information stored in the data sets based at least in part on fresh user information received by the first server from user devices associated with the one or more users assigned to perform the plurality of tasks, wherein the first server is configured to perform a test to determine if the predetermined task is associated with any data set stored at the first server; and
receiving a reply from the first server at the second server in response to the information request depending on results of the test.

* * * * *